July 6, 1948.  H. P. KEEFER  2,444,704
BUTTER TRAY
Filed Oct. 11, 1944  3 Sheets-Sheet 1
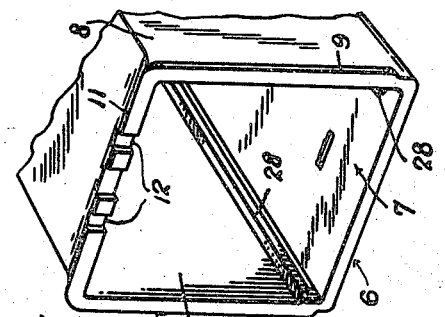
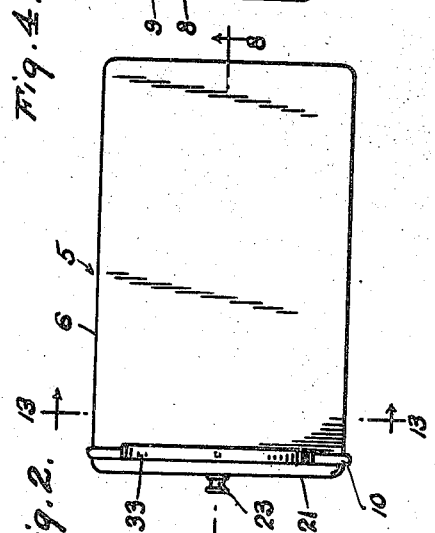
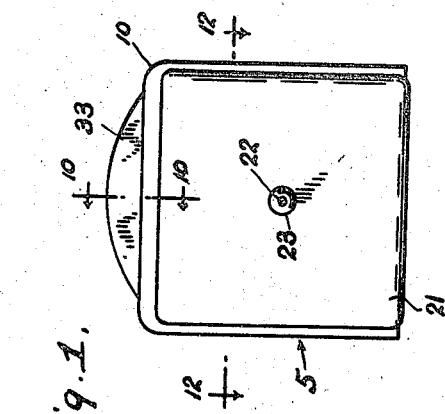
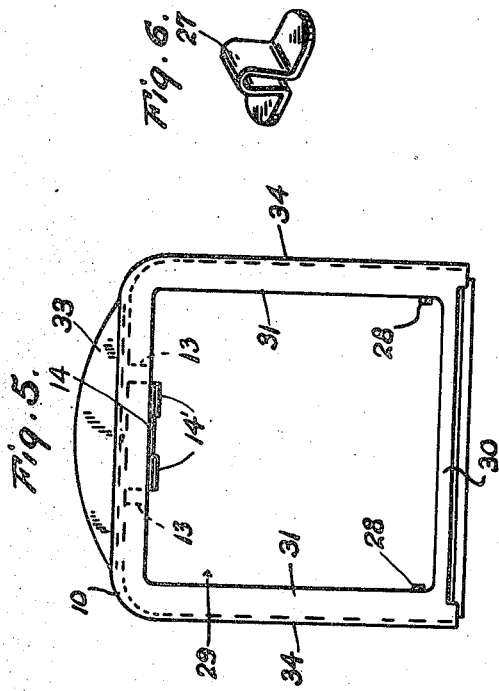
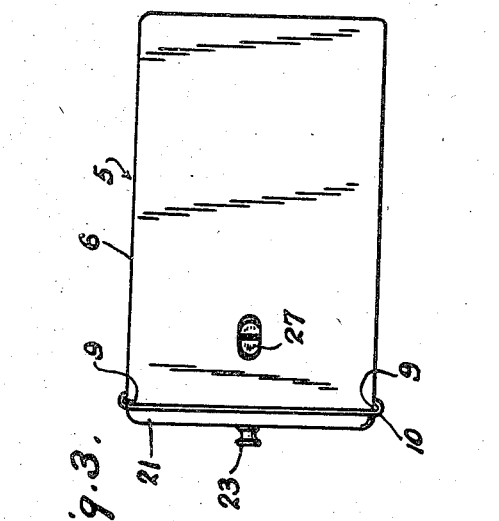
Inventor
Harry P. Keefer
By L. B. James
Attorney July 6, 1948.  H. P. KEEFER  2,444,704
BUTTER TRAY
Filed Oct. 11, 1944  3 Sheets-Sheet 2
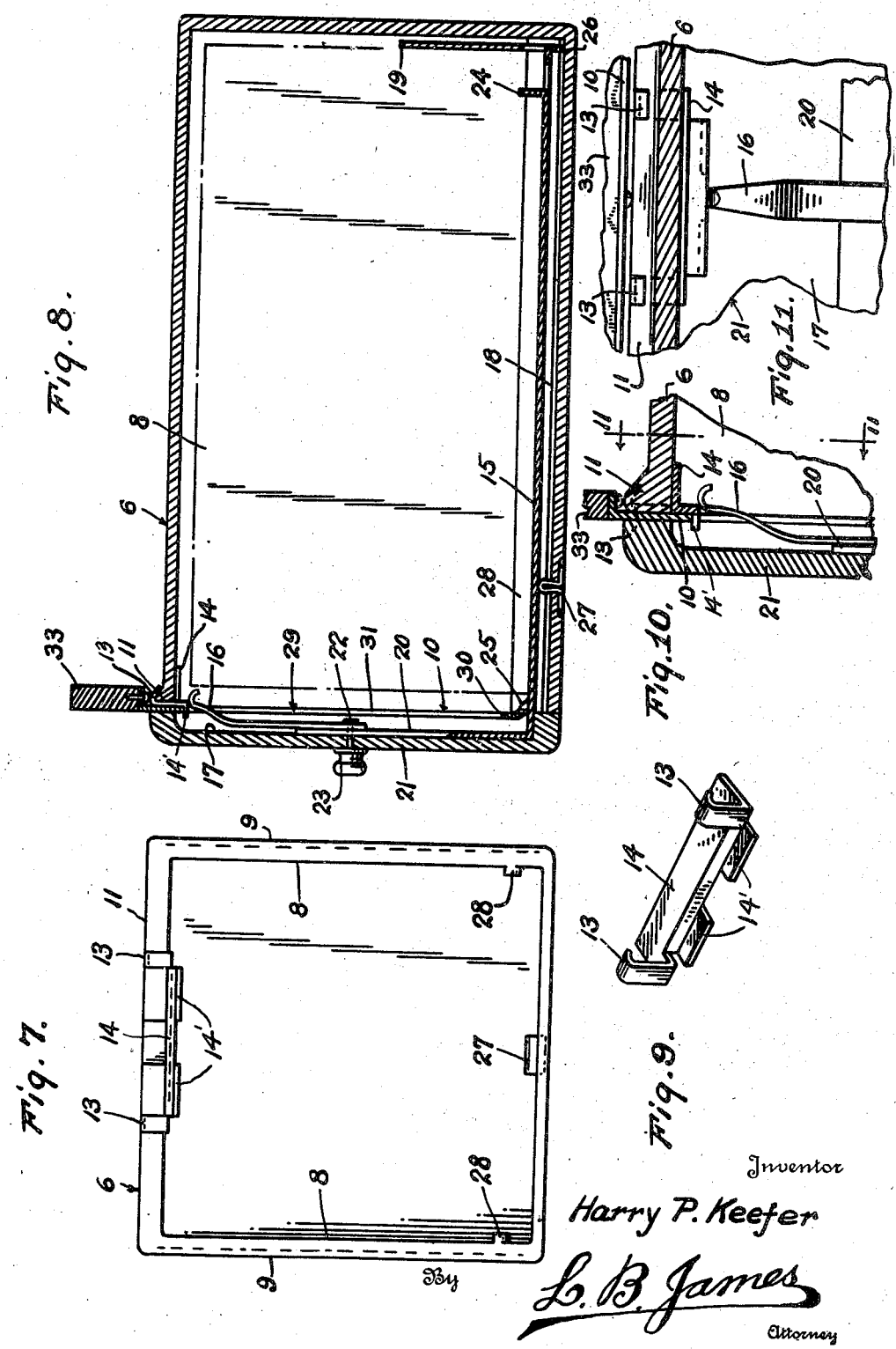
Inventor
Harry P. Keefer
By L. B. James
Attorney July 6, 1948.  H. P. KEEFER  2,444,704
BUTTER TRAY
Filed Oct. 11, 1944  3 Sheets-Sheet 3
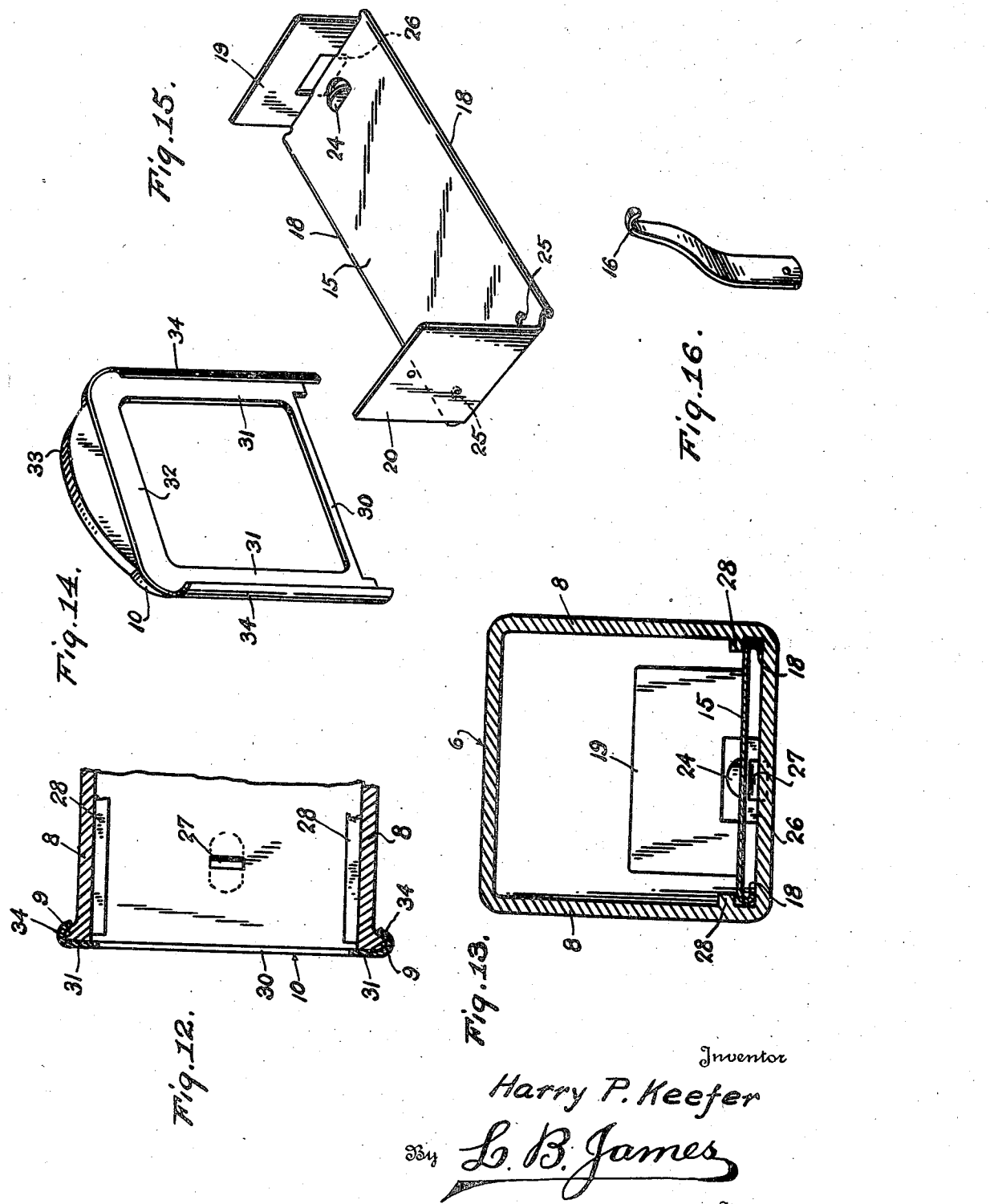
Inventor
Harry P. Keefer
By L. B. James
Attorney Patented July 6, 1948

2,444,704

UNITED STATES PATENT OFFICE 2,444,704

BUTTER TRAY

Harry P. Keefer, Youngstown, Ohio

Application October 11, 1944, Serial No. 558,153

2 Claims. (Cl. 31—20)

This invention relates to butter trays and more particularly a combined butter tray and butter cutter.

One of the objects of this invention resides in the provision of a combined butter tray and cutter whereby the butter can be stored in a refrigerator in sealed condition against collecting or absorbing odors from other foods within the refrigerator.

Another object of this invention resides in the provision of a combined butter tray and cutter adapted to permit slicing of the butter therein as used.

A further object of this invention resides in the provision of means whereby the butter supporting shelf will be removably locked in the compartment against accidental opening when handling the same.

A still further object of this invention resides in means for removably securing the butter cutting knife on the front or open end of the butter compartment.

Aside from the aforesaid objects, this invention resides in means for preventing the butter supporting shelf from sliding entirely out of the compartment.

In addition to the foregoing objects, this invention resides in means for preventing the butter cutting knife from accidental removal relative to the compartment when being disposed in cutting position.

Among the many objects of this invention is provision of a combined butter cutting and storage receptacle whereby the elements thereof can be readily taken apart for cleaning.

With these and other objects in view, this invention resides in certain novel features of construction and arrangement of elements to be hereinafter more particularly set forth in the specification, illustrated in the accompanying drawings and pointed out in the appended claims and, while this disclosure depicts my present conception of the invention, the right is reserved to resort to such changes in construction and arrangement of parts as come within the spirit of the invention.

In the accompanying drawings forming a part of this application:

Fig. 1 is a front view of the combined butter tray and slicer.

Fig. 2 is a plan view thereof.

Fig. 3 is a bottom view thereof.

Fig. 4 is a detail perspective view of the open end of the compartment.

Fig. 5 is a front view of the compartment with the butter supporting shelf removed.

Fig. 6 is a perspective view of the butter supporting shelf stop.

Fig. 7 is a front view of the compartment with the butter slicing knife removed.

Fig. 8 is an enlarged longitudinal sectional view taken approximately on line 8—8 of Fig. 2.

Fig. 9 is a perspective view of the butter cutting knife stop.

Fig. 10 is a detail sectional view taken approximately on line 10—10 of Fig. 1.

Fig. 11 is a similar view taken approximately on line 11—11 of Fig. 10.

Fig. 12 is a horizontal sectional view taken approximately on line 12—12 of Fig. 1.

Fig. 13 is a sectional view taken approximately on line 13—13 of Fig. 2.

Fig. 14 is a perspective view of the butter slicing knife.

Fig. 15 is a perspective of the butter supporting shelf.

Fig. 16 is a perspective view of the butter supporting shelf locking clip.

In the present illustration of this invention, the numeral 5 designates, in general, a combined butter tray and slicer and consists of a substantially rectangular compartment 6 having its front end open, as indicated by the numeral 7, and the outer sides 8 provided with guide rails 9 to slidably accommodate a butter slicing knife 10 to be hereinafter more fully described.

Formed on the top front portion of the compartment is an upstanding flange 11 having grooves 12 therein to removably receive tongues 13 formed on a stop member 14 which is adapted to limit upward movement of the butter cutting knife by lugs 14' formed thereon and also act as a keeper for retaining a butter supporting shelf or tray 15 in closed position through the engagement therewith of a locking clip 16 secured to the front wall 17 thereof. Said locking clip is preferably formed of resilient metal or other suitable construction whereby the butter supporting shelf will be readily locked in closed position relative to the compartment and easily pulled out to dispose the butter beneath the cutting knife.

The butter supporting shelf is of substantially rectangular configuration and is provided with runners 18 along its opposite sides and with upstanding flanges 19 and 20 at its opposite ends. Flange 19 acts as an abutment for the butter while flange 20, in the instant case, acts as means to secure the cover 21 to form a closure for the compartment. A fastening element 22 is passed through the flange 20 and also through the locking clip 16 into a knob 23 on the exterior side of the cover. Projecting upwardly from the butter supporting shelf adjacent its inner end is a lug 24 adapted to extend into a block of butter to retain it on the shelf, while extending upwardly adjacent the front end of the shelf are spaced lugs 25 adapted to assist in locking the shelf in closed position relative to the compartment by resting against the inner surface of the knife 10 when it is fully disposed in the compartment 6. Formed on the rear end of the shelf is a downwardly extending lug 26 adapted to engage a removable stop 27 extending into the compartment adjacent its front end to prevent accidental dislodgement of the shelf from the compartment and also to limit its outward movement when pulling it from the compartment, said stop is adapted to be retracted or drawn outwardly from the compartment and out of the path of the lug 26 to permit the shelf to be readily inserted into or removed from the compartment.

In order to guide the shelf smoothly in the compartment, rails 28 are formed on opposite sides of the interior surfaces of the compartment and are disposed to oppose the upper side portions of the shelf so as to permit it to slide freely within the compartment without tilting.

The knife 10 is of substantially rectangular configuration having an enlarged opening 29 therein bound by a blade 30, side walls 31 and an upper wall 32 on the latter of which is secured a suitable handle 33 or the like. Formed on the side walls 31 are guide flanges 34 adapted to slidably engage the flanges 9 of the compartment to smoothly guide the knife over the open end of the compartment.

Although the combined butter tray and slicer is herein shown as constructed from metal, it is within the purview of this invention to construct it of any suitable material or combination of materials just so the gist of the invention is not departed from.

Having thus fully described my invention, it is apparent that a sanitary butter receptacle is provided and, through the particular construction thereof, it can be manufactured cheaply and assembled so it can be readily taken apart for cleaning.

What I claim and desire to protect by United States Letters Patent is:

1. A butter receptacle comprising an open end compartment, a cover over the open end of the compartment, a butter supporting shelf secured to the inner side of the cover and slidably disposed within the compartment, an open frame like knife slidably disposed on the open end of the compartment, removable stop means extending into the opening of the frame like knife in the path of its lower frame member and limiting movement thereof in raised position, a resilient locking clip secured to the cover and slidably engaging the knife stop means, and removable stop means carried by the compartment and limiting outward movement of the butter supporting shelf.

2. A butter receptacle comprising an open end compartment, a cover over the open end of the compartment, a butter supporting shelf secured to the inner side of the cover and slidably disposed within the compartment, an open frame-like knife slidably disposed on the open end of the compartment, removable stop means extending into the opening of the frame-like knife in the path of the lower frame member thereof and limiting movement of the knife in raised position, a resilient locking clip secured to the cover and slidably engaging the knife stop means, removable stop means carried by the compartment and limiting outward movement of the butter supporting shelf, and upwardly extending spaced locking lugs adjacent the front end of the butter supporting shelf extending immediately behind the blade of the knife when in its lowermost position for locking the butter supporting shelf in its closed position.

HARRY P. KEEFER.

REFERENCES CITED

The following references are of record in the file of this patent:

UNITED STATES PATENTS

| Number | Name | Date |
|---|---|---|
| 502,170 | Brundin | July 25, 1893 |
| 1,123,623 | Terry | Jan. 5, 1915 |
| 1,295,186 | Miller | Feb. 25, 1919 |
| 2,232,918 | Keefer | Feb. 25, 1941 |
| 2,251,844 | Keefer | Aug. 5, 1941 |